United States Patent
Dassow et al.

(10) Patent No.: US 7,107,492 B2
(45) Date of Patent: Sep. 12, 2006

(54) METHOD FOR ANALYZING TRANSMITTED PROTOCOL DATA UNITS

(75) Inventors: Heiko Dassow, Griesheim (DE); Guido Koeppe, Griesheim (DE)

(73) Assignee: Deutsche Telekom AG, Bonn (DE)

(*) Notice: Subject to any disclaimer, the term of this patent is extended or adjusted under 35 U.S.C. 154(b) by 775 days.

(21) Appl. No.: 10/220,966

(22) PCT Filed: Mar. 17, 2001

(86) PCT No.: PCT/EP01/03076

§ 371 (c)(1),
(2), (4) Date: Sep. 6, 2002

(87) PCT Pub. No.: WO01/79991

PCT Pub. Date: Oct. 25, 2001

(65) Prior Publication Data

US 2003/0033560 A1    Feb. 13, 2003

(30) Foreign Application Priority Data

Apr. 13, 2000  (DE) ................... 100 18 288

(51) Int. Cl.
*G06F 11/00* (2006.01)

(52) U.S. Cl. .............. 714/39; 709/230; 709/231; 719/315

(58) Field of Classification Search ............ 714/39
See application file for complete search history.

(56) References Cited

U.S. PATENT DOCUMENTS

| | | | |
|---|---|---|---|
| 5,347,524 A * | 9/1994 | I'Anson et al. ............ 714/39 |
| 5,790,812 A | 8/1998 | Frohmueller et al. ....... 395/285 |
| 6,012,095 A | 1/2000 | Thompson et al. ......... 709/231 |
| 6,912,584 B1 * | 6/2005 | Wang et al. ............... 709/231 |
| 6,963,912 B1 * | 11/2005 | Schweitzer et al. ......... 709/224 |
| 2003/0140282 A1 * | 7/2003 | Kaler et al. ................ 714/39 |

FOREIGN PATENT DOCUMENTS

| | | |
|---|---|---|
| DE | 199 36 118 | 2/2001 |
| EP | 0515907 | 12/1992 |
| EP | 0763920 | 3/1997 |
| WO | 0179991 | 10/2001 |

OTHER PUBLICATIONS

IBM Technical Disclosure Bulletin 'Non-Intrusive Object Testing in a Production Environment ' vol. 39 No. 12 1996 (XP 000686040).

(Continued)

*Primary Examiner*—Robert Beausoliel
*Assistant Examiner*—Michael Maskulinski
(74) *Attorney, Agent, or Firm*—Darby & Darby (57) ABSTRACT

A method for analyzing transmitted protocol data units of a protocol for communication between two object request brokers to obtain a representation of messages included in the transmitted protocol data units includes collecting and correlating incomplete sets of information derived from the individual protocol data units for respective objects, and obtaining, from a plurality of necessary conditions, an adequate selection criterion for an interface definition to be used in a decoding operation. The decoding operation is performed using an initialization phase, a learning phase and a decoding phase. The initialization phase includes forming at least one list of possible interface definitions. The learning phase includes introducing exclusion criteria for reducing a number of the possible interface definitions so as to uniquely determine which interface definition underlies a first object. The decoding phase includes decoding a first message transmitted from or to the first object.

16 Claims, 4 Drawing Sheets

OTHER PUBLICATIONS

Antone Gonsalves 'Tools upgrade COBRA tests' eWEEK, Jun. 20, 1999 (XP 002182427).
Wissen [Knowledge]: "CORBA, übernehmen Sie!", Services: Basisdienste für den ORB [CORBA, Take Over!, Services: Basic Services for the ORB], pp. 108-113 by Uwe Selmet, available at http://premium-5ndunhzhmnj2xp.eu.clickandbuy.com/ix/1999/01/; printed on Feb. 1, 2006, (11 pages).
G. Carls, G. Aschemann, Y. Lu: "Validating Interaction Patterns of CORBA Based Network Management Systems", "ANOMS 2000, 2000 IEEE/IFIP, Network and Management Symposium", "The Networked Planet: Management Beyond 2000", Apr. 10-14, 2000, Hilton Hawaiian Village, Honolulu, Hawaii; (14 pages).
Gabriel Minton "IIOP Specification: A Closer Look" Unix Review Jan. 1997, pp. 41-50 (XP 002102559) available at http://www.blackmagic.com/people/gabe/iiop.html; (9 pages), printed on Feb. 2, 2006.
Todd Scallan "Monitoring and Diagnostics of CORBA Systems" Java Developers Journal.COM, Jun. 2000, pp. 138-144 (XP 002182426), available at http://jdj.sys-con.com/read/36421.htm; (5 pages), printed on Feb. 2, 2006.

* cited by examiner

Fig. 1

| | | |
|---|---|---|
| 2 byte | | year |
| 1 byte | | month (0-11) |
| 1 byte | | date |
| 1 byte | | hour |
| 1 byte | | minute |
| 1 byte | | second |
| 2 byte | | millisec |
| 4 bit (MSB) | 0000 | TCP (RFC: 793) |
| 4 bit (LSB) | | interfaceNr |
| 4 byte | | iAddrSource |
| 4 byte | | iAddrDest |
| 2 byte | | sourcePort |
| 2 byte | | destPort |
| 4 byte | | seqNumber |
| 4 byte | | ackNumber |
| 1 byte | | dataOffset |
| 1 byte | | flags |
| 2 byte | | windowSize |
| 2 byte | | checkSum |
| 2 byte | | urgentPointer |
| 2 byte | | messageSize |
| [messageSize] byte | | GIOP Message |

Fig. 2

```
00000000h : 47 49 4F 50 01 00 00 00 00 00 00 5C 00 00 00 00   ; GIOP.......\....
00000010h : 00 00 00 04 01 00 00 00 00 00 00 33 3A 5C 31 39   ; ...........3:\19
00000020h : 32 2E 31 36 38 2E 31 39 39 2E 31 30 33 3A 4E 53   ; 2.168.199.103:NS
00000030h : 3A 3A 3A 49 46 52 3A 43 6F 73 4E 61 6D 69 6E 67   ; :::IFR:CosNaming
00000040h : 5F 4E 61 6D 69 6E 67 43 6F 6E 74 65 78 74 00 00   ; _NamingContext..
00000050h : 00 00 00 05 6C 69 73 74 00 00 00 00 00 00 00 01   ; ....list........
00000060h : 00 00 00 00 7F FF FF FF                           ; ....|ÿÿÿ
```

Fig. 3

```
interface NamingContext{
        void list (
                in unsigned long how_many,
                out BindingList bl,
                out BindingIterator bi
        );
        Object resolve (
                in Name n
        ) raises( NotFound, CannotProceed, InvalidName);
};
```

Fig. 4

```
Message {
    MessageHeader {
            magic {'G','I','O','P'},
            GIOP_version {major 1,minor 0},
            flags 0,
            message_type 0,
            message_size 92
    }
    RequestHeader {
            service_context {},
            request_id 4,
            repose_expected true,
            reserved {46,49,57},
            object_key {58,92,49,57,50,46,49,54,56,46,49,57,57,46,49,48,51,58,78,83,
                    58,73,82,58,67,111,115,78,97,109,105,110,103,95,78,97,109,10,
                    103,67,111,110,116,101,120,116,0},
            operation "list",
            requesting_principal {0}
    }
    CosNaming/NamingContext/list{ how_many 2147483647}
}
```

METHOD FOR ANALYZING TRANSMITTED PROTOCOL DATA UNITS

BACKGROUND

The present invention relates to a method for analyzing transmitted protocol data units (PDUs) of a general protocol for communication between Object Request Brokers (ORB).

Methods for analyzing transmitted protocol data units of a general protocol for communication between Object Request Brokers (ORB) for the purpose of representing the contained messages as completely as possible are generally known.

CORBA is described in "Wissen" [Knowledge], pages 108–113 in the article "CORBA, tibemehmen Sie", Services: Basisdienste für den ORB, ["CORBA, Take Over", Services: Basic Services for the ORB], by Uwe Seimet. It was also described in a publication entitled "Validating Interaction Patterns of CORBA Based Network Management Systems" by Guido Carl Gerd Aschemann and Ying Lu within the frame work of "NOMS 2000, 2000 IEEE/IFIP, Network and Management Symposium" "The Networked Planet: Management Beyond 2000", Apr. 10 through 14, 2000, Hilton Hawaiian Village, Honolulu, Hi., and is used to distribute applications over several operating system processes. CORBA allows non-proprietary, interhost communication of distributed applications. In this context, a distinction is made between the roles of client and server. An application in the client role transmits a request to another application which works in the server role. This request is processed by the application in the server role, and a corresponding response is returned to the client. The general protocol for communication between two Object Request Brokers is used as the protocol for conveying these messages. In TCP/IP-based networks, one uses its special form, the so-called "Internet Inter-ORB Protocol (IIOP)". The information as to which contents can be exchanged between client and server is established using an object-oriented interface description language (IDL).

In the event of an unexpected behavior of a distributed application or during its acceptance test, it may be necessary to monitor the communication between client and server to be able to draw conclusions on the behavior of the individual application components. For example, the literature reference cited above describes the following procedures:

the distributed application can be extended on the client side or on the server side in such a manner that the exchanged GIOP messages are also completely or partially routed to a component of the distributed application that is intended for recording and evaluation;

the PDUs exchanged between client and server can be recorded by a trace tool and decoded using additional knowledge on the type of the exchanged messages and on the products used. The decoding of the messages can be carried out manually or in an automated manner.

an application, which has been developed exclusively for test purposes, is integrated into the communication between client and server. As a server, this application receives a request from the client and, as a client, routes this request to the server. The response is returned accordingly. As a result of this, all PDUs can be monitored and evaluated by this test application.

These known methods have the disadvantage that the passive recording of the General Inter ORB Protocol (GIOP) PDUs exchanged between client and server alone is not sufficient to completely decode the message. This results from several causes, which will be shown below.

As a rule, only the values, for example, 123, but not their type code, for example, whole number, are encoded in a GIOP PDU. Therefore, it is not possible to determine just from a PDU the number of parameters contained in a PDU or the type of the values.

The name of the invoked method is not encoded in an invocation in its full context. There is missing a unique identification of the interface definition in which this method is declared. If identical methods should have been defined in different interface definitions with different signatures, then it is not possible to identify the method that is actually encoded, given identical value encoding length.

While the agent on the server side, via the auto-generated and published "target address", is able to associate incoming requests with a particular CORBA object, a trace tool according to CORBA standard is indeed able to check the content of the target address for equality according to the index but unable to make an association with a concrete object and with the interface definition underlying the object. Only with the aid of proprietary extensions of the CORBA standard is it possible to obtain information from the content of a target address using a trace tool.

In CORBA, provision is made for an object reference to be transferred from the server to the client, circumventing the GIOP protocol, for example, as a text file on a diskette. When this object reference, which is exchanged as an interoperable object reference (IOR) which serves to uniquely address CORBA objects on the basis of the IIOP protocol, also contains information on the associated interface definition, this item of information is generally never exchanged between client and server again. Consequently, there is no way for a CORBA trace tool to obtain this information without actively querying the application components involved in the communication. This, however, would be contrary to the paradigm that a trace tool is only allowed to monitor passively.

Consequently, the problem exists that it is indeed possible for a single GIOP PDU to be uniquely correlated and decoded in the context known to client and server but that there is no unique and standard-compliant possibility for a recorded PDU to be decoded outside of this known context.

SUMMARY OF THE INVENTION

Therefore, an object of the present invention is to provide a method for analyzing transmitted protocol data units of a general protocol for communication between two Object Request Brokers which control or make possible the communication between a CORBA client and a CORBA server so as to represent the contained messages relatively completely and allow the transmitted messages to be decoded by passive monitoring of the exchanged GIOP PDUs for a sufficient period of time, without changing the implementation of client and server.

The present invention provides a method for analyzing transmitted protocol data units of a protocol for communication between two object request brokers to obtain a representation of messages included in the transmitted protocol data units. The method includes: collecting and correlating incomplete sets of information derived from protocol data units for respective objects; obtaining, from a plurality of necessary conditions, a selection criterion for an interface definition to be used in a decoding operation; and performing the decoding operation using an initialization phase, a learning phase and a decoding phase, the initialization phase including forming at least one list of possible interface definitions, the learning phase including introducing exclusion criteria for reducing a number of the possible interface definitions so as to uniquely determine which interface definition underlies a first object, the decoding phase including decoding a first message transmitted from or to the first object.

The method according to the present invention advantageously allows the transmitted messages to be completely decoded by passive monitoring of the exchanged GIOP PDUs for a sufficient period of time without changes in the implementation of client and server. This is achieved by systematically evaluating and correlating the exchanged messages in kind of a learning phase so that ambiguities which can occur during the decoding of an individual message are ruled out.

In this manner, a unique and standard-compliant solution has been created which allows a recorded protocol data unit to be decoded outside of this known context.

Further advantages, features and possible uses of the present method for analyzing transmitted GIOP PDUs for the purpose of representing the contained messages as completely as possible follow from the following description in conjunction with the exemplary embodiments shown in the drawing.

BRIEF DESCRIPTION OF THE DRAWINGS

In the following, the present invention will be explained in greater detail based on exemplary embodiments with reference to the drawings.

DETAILED DESCRIPTION

The following is a brief explanation or definition of the terms which will be used hereinafter.

CORBA Common Object Request Broker Architecture:
  Definition of a framework for distributing an application across hosts.
GIOP General Inter-ORB Protocol:
  General protocol for communication between two ORBs.
ORB Object Request Broker:
  Permits communication between CORBA client and CORBA server.
IIOP Internet Inter-ORB Protocol:
  Application of GIOP for TCP/IP-based networks.
IIOP PDU Internet Inter-ORB Protocol Data Unit
PDU Protocol Data Unit:
  a binary-code message which is exchanged between a transmitter and a receiver.
Message An item of information that is transmitted as a PDU, the semantics of the information being in the fore and not so much the way of coding.
TCP/IP Transmission Control Protocol/Internet Protocol (generally used Internet protocol).
UML Unified Modeling Language
Host Computer on which part of a distributed application runs and which can be accessed by a unique address.
Port Logical subdivision of an address which makes it possible to establish connections to a plurality of different agents within a host.
Agent An entity which is responsible for transmitting and receiving GIOP messages.
Object Key A particular value which is provided by an agent and used for generating an IOR.
IOR Interoperable Object Reference: Used for uniquely addressing CORBA objects on the basis of IIOP protocols.
Target Address
  As of GIOP release 1.2, the term "Target Address" has been introduced which describes a plurality of different addressing modes for an object. As for the basic functionality, the "target address" and the object key, which was previously used exclusively, can be regarded as substantially identical.
Type Code Description of a data structure within an ORB.
Client A role a process can take on within the distributed application. A client is an agent that opens a connection to a server.
Server A role a process can take on within a distributed application. A server is an agent to which a connection is established by a client.
Address A unique identification of a host in the exemplary embodiments.
Distributed CORBA application:
  composed of a plurality of processes which are distributed on different hosts and exchange GIOP messages via an interface defined in IDL.
IDL Object-oriented interface description language.
CDR Common Data Representation
Request A specific GIOP message which transmits a method invocation from the client to the server.
Reply A specific GIOP message which is transmitted from the server to the client in response to a preceding request.
Process Storage entity of a program on a host.
Interface The description, which is defined in IDL, of a CORBA object whose entity can be accessed via the agent in the server in the form of method invocations.
Decoder A system for converting the information that is encoded in a PDU into a readable representation of the contained message. In the context of the present exemplary embodiment, this is a system which uses the method according to the present invention.
Signature A term which was coined by programming languages. Methods of the same name can differ from each other because of different parameters. These differentiation criteria are referred to as signature. IDL rules out the definition of methods of the same name within the same context so that it is not required for the signature of a method to be encoded as well.
IFR Interface Repository:
  An option defined in the COBRA standard for making information available via an IDL definition for later accesses.

Figure 1:
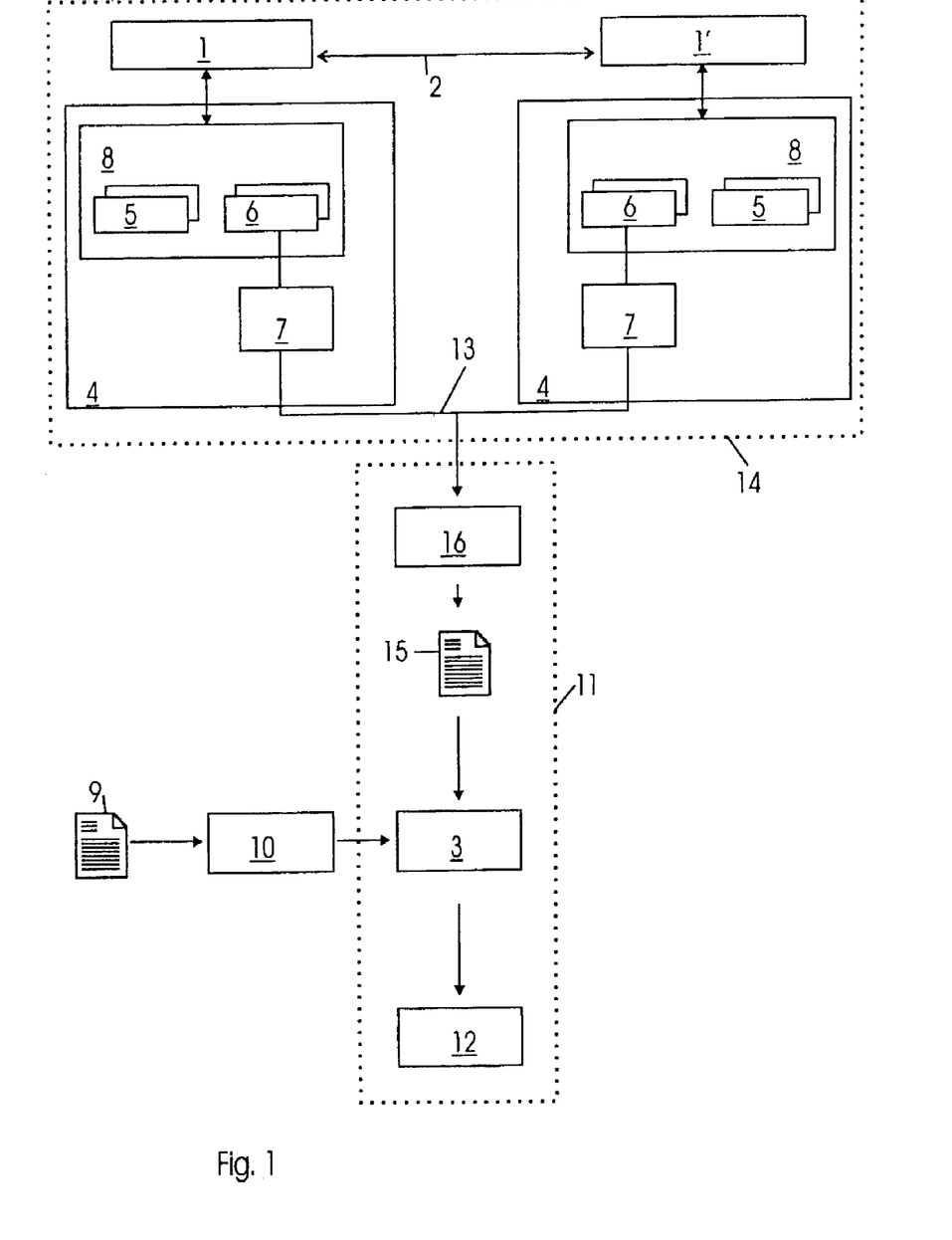
FIG. 1 shows the use of a passive GIOP decoder by the example of the Internet Inter-ORB Protocol (IIOP)

FIG. 1 shows a basic variant of the method according to the present invention and, in particular, of its practical application. Two components 1 and 1' of a distributed CORBA application 14 communicate with and among each other, one component 1 or 1' acting and operating in a client role and the other in a server role, respectively. The two components 1 and 1' are assumed to run on different host systems so that the messages have to be transmitted via Internet Inter-ORB Protocol IIOP 2. In the process, a TCP/IP connection 13 is established between the two involved Object Request Brokers 4, and the Internet Inter-ORB Protocol data unit (IIOP-PDU) is transmitted over this connection. While, using an interface 8, an exact description of a value 6 is present within Object Request Broker 4 in the form of a so-called "type code" 5 which represents the description of a data structure within an Object Request Broker 4, the transmission of type code 5 is dispensed with in the case of the protocol data unit. The decoding of a value in the respective other Object Request Broker 4 via a CDR decoder 7 of interface 8 works because all required information, for example, $Request_{13}$ id, "Target Address" and name of the invoked method, are available there. This information allows the protocol data unit (PDU) to be associated with an object. The type codes 5 required for the decoding in GIOP decoder 3 can be determined by the interface definition associated with the object. GIOP decoder 3 forms part of a passive CORBA analyzer 11, receives also information from an IDL file 9 via a CORBA interface repository 10 and delivers GIOP message 12. Passive CORBA analyzer 11 also includes TCP/IP memory dump 15 with GIOP PDUs and trace tool 16.

Figure 2:
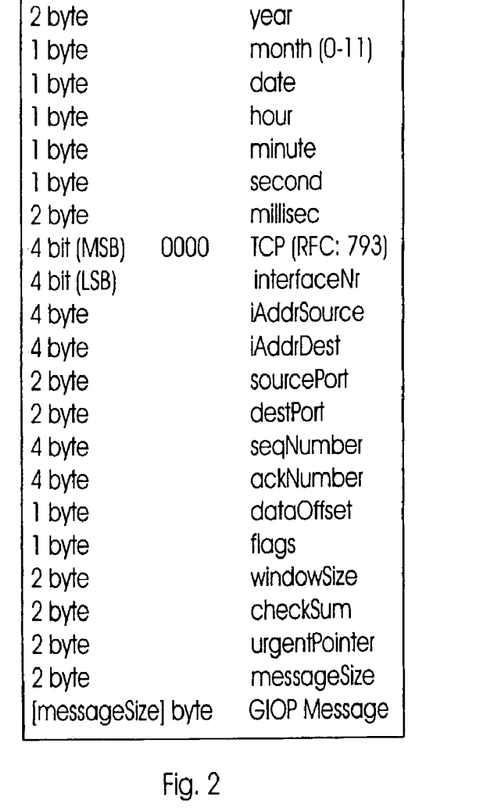
FIG. 2 represents a trace interface for a GIOP message which is transmitted via TCP/IP.

FIG. 2 shows how such a trace tool is intended to transfer the monitored protocol data units (PDU) for further evaluation. The monitoring of protocol data units (PDU) at various points of a system, for example, hosts, can take place simultaneously.

Figure 3:
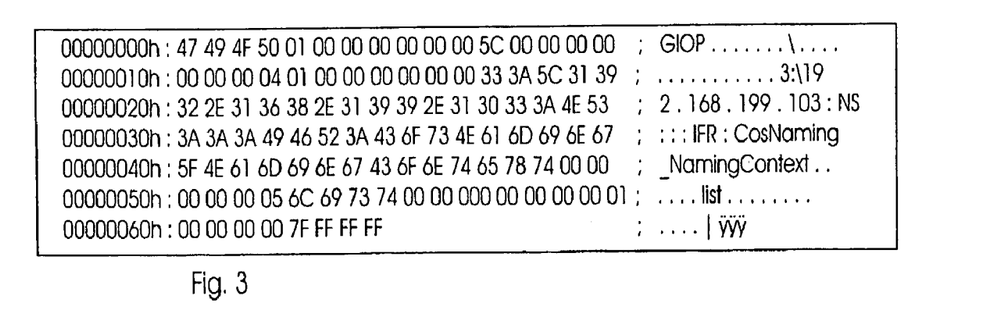
FIG. 3 is a representation of a recorded GIOP message.
Figure 4:
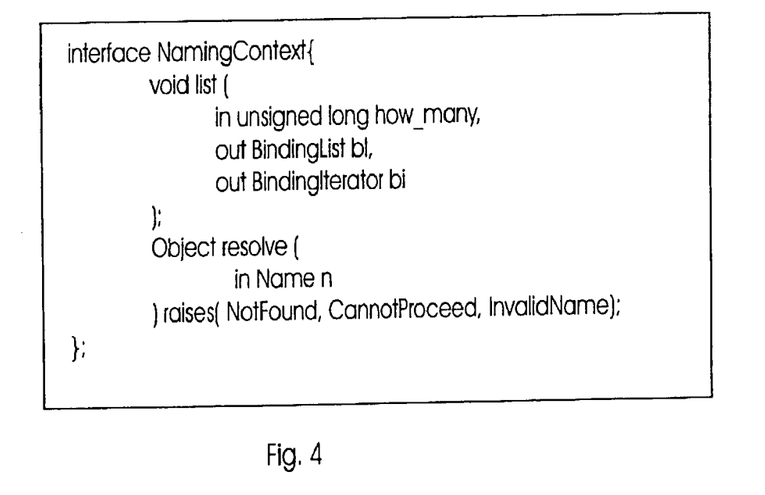
FIG. 4 depicts the IDL definition of an interface.
Figure 5:
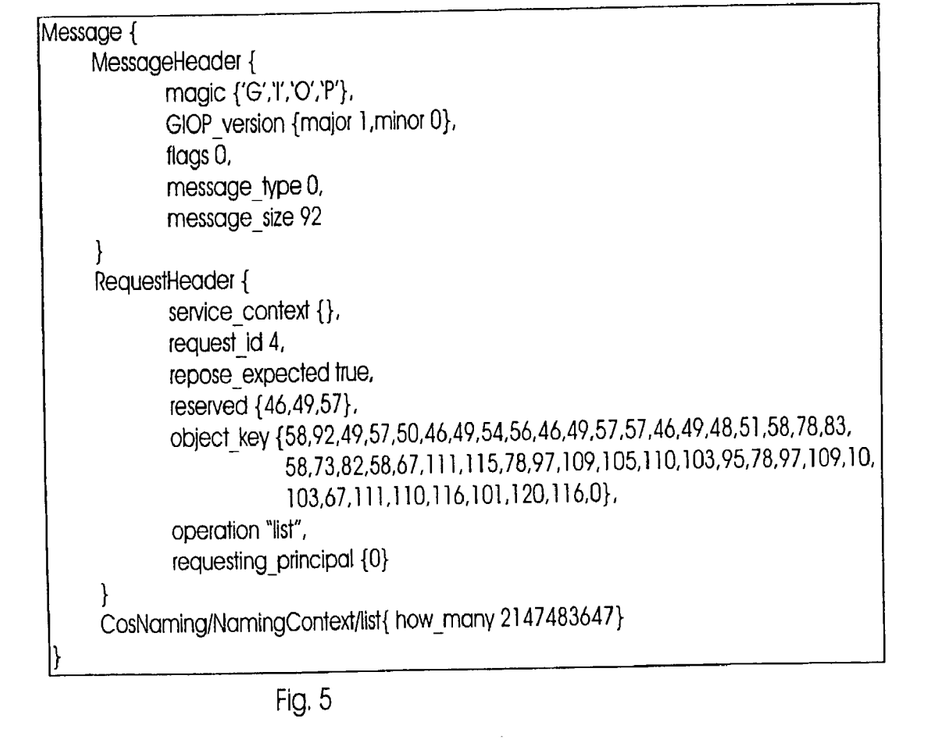
FIG. 5 shows a manually decoded GIOP message.

FIG. 3 shows that the method, which will be explained in greater detail below by way of an example, allows the General Inter-ORB Protocol data units (GIOP PDU) to be completely decoded, as shown in FIG. 5, only on the basis of the monitored protocol data units (PDU), the connection parameters, and of the associated IDL definition according to FIG. 4.

Because of the specific information of the connection-oriented protocol used, it is possible for a recorded General Inter-ORB Protocol message to be associated with the two communicating agents or components 1 and 1'. Via the target address encoded in a request, it is moreover possible for the addressed CORBA object to be uniquely identified. Because of the "Reply id", which is also transmitted, a reply can be uniquely associated accordingly by the fact that the reply is transmitted over the same connection as the associated request.

During analysis of a protocol data unit (PDU) by a passive GIOP decoder 3, a problem exists whose solution will be described below.

A logged request protocol data unit (Request PDU) contains only the name of the method to be invoked itself but neither its IDL definition nor the name of the interface underlying the addressed object. Therefore, the information required for decoding a protocol data unit (PDU) is missing. The exemplary embodiment depicted in FIG. 6 represents a method which allows GIOP decoder 3 to decode the received protocol data units (PDU) all the same.

Figure 6:
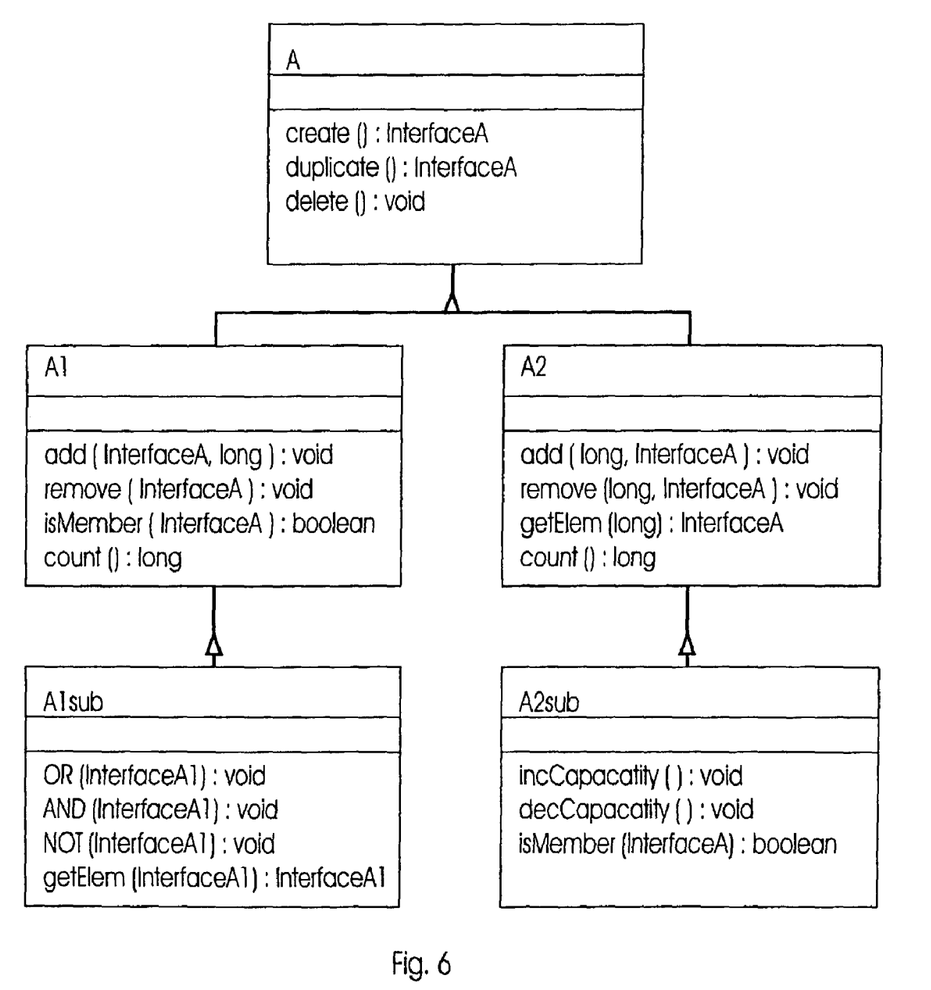
FIG. 6 shows a UML representation of a hierarchical interface definition.

FIG. 6 contains interface definitions in UML representation.

As already explained, the information that the method "Count" has been invoked is not sufficient to decide whether interface A1, interface A2 or one of the interface definitions inheriting from these definitions underlies the addressed object. Neither would the invocation of the method getElem uniquely decide which interface definition underlies the object. However, other interface definitions are perfectly possible within the scope of the present method. Therefore, an idea of the method according to the present invention is to collect and correlate the individual incomplete sets of information derived from the protocol data units (PDU) individually for every single object. In this manner, an adequate selection criterion for the interface definition to be taken as a basis during the decoding is obtained from a plurality of necessary conditions.

In this context, the following phases can be distinguished in GIOP decoder 3 with respect to a single object:

1. Initializing:
    Drawing up lists of all possible interface definitions. The lists are stored specifically for a particular host, a particular agent, that is, an entity which is responsible for transmitting and receiving GIOP messages, or for an agent-specific target address. If no additional information is known, then, in the most general case, only the list of all interface definitions used in the overall system is to be initialized.
2. Learning:
    Use of connection criteria to reduce the number of possibilities, the evaluated message not yet being able to be uniquely decoded. In such a case, there is more than one interface definition which can underlie a particular object.
3. Decoding:
    It has been uniquely ascertained which interface definition underlies the object. Therefore, the message transmitted from or to the object can be decoded.

In principle, there is no clear separation, in particular, between phases 2 and 3. It can happen that it is necessary to partially jump back from phase 3 to phase 2. All messages that cannot be decoded because phase 3 has not yet been reached can either only be output in non-decoded form or the decoding [process] must be completed at a later time. A particularly simple and advantageous embodiment is to initially carry out phase 2 with all recorded protocol data units (PDU) and to subsequently decode all these protocol data units (PDU) once more in phase 3.

During the exchange of an interoperable object reference (IOR), which is used to uniquely address CORBA objects on the basis of the IIOP protocol, information is transmitted from the server to the client. Knowing this information, the later decoding of the GIOP messages can be made much easier. However, the exchange of an interoperable object reference (IOR) is indeed a prerequisite for the subsequent message exchange but does not form part of it. For this reason, it is helpful to selectively log/trace further IIOP connections in addition to the actual client-server connection, and to include them in the subsequent decoding. However, this requires additional knowledge on the system to be analyzed. Connections to a naming server or to an information repository are particularly interesting for this.

In an embodiment of the method according to the present invention information obtained with regard to the active servers, the underlying interface definition and the associated address by selective logging/recording and decoding is passed on to a non-system client implementation. Due to this procedure, it is possible to intervene in the communication of the distributed applications without previously loading or requesting an object reference. This avoids a problem shared by many active test applications, namely the problem of obtaining an object reference when this object reference is not known outside of the distributed application.

In the following, several special cases will now be described in certain conditions.

In the first case, it is assumed that the invoked method and the associated interface definition are not stored in the interface repository (IFR). In this context, it is assumed that not all of the interface definitions used in the distributed application are stored in interface repository (IFR) of GIOP decoder 3. In this case, it is assumed that in interface repository (IFR), no method is defined with the proper name at all. Therefore, a method AND is invoked in request protocol data unit (PDU), and thus, based on the interface definitions present in interface repository (IFR) (for example, interface A, interfaces A1 and A2), it is neither possible to restrict the number of possible interface definitions for the addressed object nor can any information be obtained with regard to the decoding of this protocol data unit (PDU). Therefore, this protocol data unit (PDU) cannot be represented in decoded form either.

In the second special case, it is assumed that method getElem, which is defined in an A1Sub, is encoded in the request protocol data unit. It is further assumed that a method getElem is at the same time defined in A2 as well. Should interface definition A2 still be in the set of possible interface definitions for the discussed request, then GIOP decoder 3 will establish that the encoded GIOP message cannot be decoded using definition A2: getElem. Because of this, GIOP decoder 3 can rule out that interface A2 and all definitions inherited therefrom belong to the set of interface definitions that are possible for the addressed object. In this example, therefore, definitions A2 and A2Sub can be ruled out, apart from the fact, however, that A2Sub would not be looked at in GIOP decoder 3 anyway.

In the third special case A3, it is assumed that the invoked method and the associated interface definition are stored in interface repository (IFR). However, the definition which is compatible therewith is present outside of interface repository IFR in another interface definition. The request which invokes a method A2 "Sub::ismember" is erroneously associated by the method with interface definition A1 because this is the only definition in interface repository (IFR) that includes this method. Thus, it is indeed possible to correctly decode protocol data unit (PDU) but future requests cannot be decoded due to false data on the interface definition used for the object. In order to rule out this erratic behaviour, two basic procedures can be implemented:

1. The operator of GIOP decoder 3 must ensure that all IDL definitions used in the distributed application are stored in interface repository (IFR). If, in this example, A2 Sub was also known in interface repository IFR, then the erroneous decision described would not occur.
2. GIOP decoder is manually configured in such a manner that, on the basis of blocking lists, certain requests, which are identified via the method name contained, are not used for ruling out interface definitions.

In two further special cases B1 and B2, it is assumed that a request protocol data unit (PDU) cannot be uniquely associated with a single interface definition but that the protocol data unit can already be decoded because only identical method definitions are left for selection in the different interface definitions. In special case B1, the decoding is nevertheless possible because the ability is inherited via a common ancestor. Thus, the method definition is not only equal but even identical and, until a more precise statement is possible, definition A can be assumed to underlie the object.

In special case B2, it is assumed that a plurality of interface definitions without a common ancestor are possible. Therefore, the case occurs that a particular method was indeed not inherited via a common ancestor but that the definition exists several times so that it is possible to decode the request even without a decision as to whether A1:X or A2:X was meant.

Finally, a special case C will be described in which a request can be decoded on the basis of a plurality of different method definitions. Since the definitions differ from each other, the decoding of protocol data unit (PDU) would produce, in each case, a different message as a result. Thus, protocol data unit (PDU) can be decoded only if the incompatible definitions can be ruled out on the basis of other protocol data units (PDU).

A basic sequence of the method, which is represented in a simplified form as a pseudocode, will be described below.

It is assumed for simplification that TCP was used as the transport protocol. Also for simplification, it is assumed that there are only the GIOP message types request and reply. However, this does not change anything about the basic mode of operation of the method.

1. Read next TCP message
2. Determine the message type
    2.1. In the case of a request, proceed with 3
    2.2. In the case of a reply, proceed with 4
3. Decode the request
    3.1. Determine the COBRA agent from the fields iAddrDest and DestPort
    3.2. Determine the name of the invoked method from the GIOP coding
    3.3. Establish a list of all interface definitions possible for this agent under the object_key used
        3.3.1. If no list is stored, generate new list containing all interface definitions stored in the IFR
        3.3.2. Load list
    3.4. If the method name is in a list of blocked methods, skip point 3.5 and proceed with point 3.6
    3.5. Update the list
        3.5.1. Remove all elements from the list in which the current method in the interface definition is not permitted
            3.5.1.1. If the method is not stored in any of the interface definitions, then special case A1 applies. Undo this step and proceed with 1
            3.5.1.2. If the method is not stored in any of the interface definitions in such a manner that the current message can be decoded, then special case A2 applies. In this case, remove only the elements which define this incompatible method, and proceed with 1
            3.5.1.3. Remove all elements which define this method incompatible or not at all
        3.5.2 Store the updated list
    3.6. Decode the message
        3.6.1. If only one interface definition is stored in the list, take this interface definition to decode the message. Proceed with 3.7
        3.6.2. If a unique hierarchical inheritance relation exists among the interface definitions contained in the list, then special case B1 applies. In this case, take the IDL definition of the common ancestor contained in the list. Proceed with 3.7
        3.6.3. If the respective method was defined equal in the interface definitions contained in the list, then special case B2 applies. In this case, take an arbitrary IDL definition contained for decoding. Proceed with 3.7.
        3.6.4. Special case C applies: The message is currently not uniquely decodable. Proceed with 1.
    3.7. Store information for decoding the reply under a label composed of "iAddrSource", "SourcePort", "iAddrDest" and "DestPort".
    3.8. Proceed with 1
4. Decode the reply
    4.1. Determine the COBRA agent from the fields iAddrSource and SourcePort
    4.2. If the associated request is not stored under a label composed of iAddrDest, DestPort, iAddrSource and SourcePort, then proceed with 1

4.3. Load the associated request
4.4. Take the IDL definition of the request and decode the reply
4.5. Proceed with 1
1,1' components of a CORBA application which is client/server-distributed via IIOP
2 IIOP Internet Inter-ORB Protocol
3 GIOP decoder
4 Object Request Broker
5 type name or code
6 value
7 CDR coder
8 interface
9 IDL file
10 CORBA IFR
11 passive CORBA analyzer
12 GIOP message
13 TCP connection
14 distributed CORBA application
15 TCP/IP memory dump with GIOP PDUs
16 trace tool

What is claimed is:

1. A method for a analyzing transmitted protocol data units of a protocol for communication between two object request brokers to obtain a representation of messages included in the transmitted protocol data units, the method comprising:
   collecting and correlating incomplete sets of information derived from protocol data units for respective objects;
   obtaining, from a plurality of necessary conditions, a selection criterion for an interface definition to be used in a decoding operation; and
   performing the decoding operation using an initialization phase, a learning phase and a decoding phase, the initialization phase including forming at least one list of possible interface definitions, the learning phase including introducing exclusion criteria for reducing a number of the possible interface definitions so as to uniquely determine which interface definition underlies a first object, the decoding phase including decoding a first message transmitted from or to the first object.

2. The method as recited in claim 1 wherein the communication between the two object request brokers is included in a communication from a first and a second component, the first component installed on a first host and acting in a client role and the second component installed on a second different host and acting in server role, the first and second components being included, in a distributed CORBA application.

3. The method as recited in claim 1 wherein:
   the individually collecting and correlating is performed by collecting the incomplete sets of information in a passive manner by logging the incomplete sets of information;
   the object request brokers are included in a distributed application and the decoding operation is performed using an object-oriented description language definition used in the distributed application;
   the decoding operation is performed by ruling out some of existing ambiguities by a uniqueness of an encoded method name or a unique parametrization thereof; and
   the decoding operation is performed by systematically resolving, in an iterative manner using a plurality of protocol data units of a general inter-ORB protocol, ambiguities that cannot be ruled out using information encoded in a single protocol data unit.

4. The method as recited in claim 1 wherein the learning phase is performed initially with recorded protocol data units and wherein the decoding phase is then performed on the recorded protocol data units.

5. The method as recited in claim 1 further comprising restricting initial possible interface definitions for an agent in a preliminary phase so as to establish interface definitions that are used for this forming lists of possible interface definitions.

6. The method as recited in claim 5 wherein the agent is defined by an IP address and a TCP port in an internet inter-ORB protocol.

7. The method as recited in claim 1 further comprising restricting initial possible interface definitions for a host in a preliminary phase so as to determine usable interface definitions.

8. The method as recited in claim 7 wherein the host is defined by an IP address in an internet inter-ORB protocol.

9. The method as recited in claim 1 further comprising:
   queuing protocol, data units which cannot be decoded due to lack of information; and
   decoding the protocol data units which cannot be decoded due to lack of information at a later time when needed information has been obtained on the basis of other decoded protocol data units.

10. The method as recited in claim 1 further comprising using a blocking list so as not to use a request to rule out an interface definition.

11. The method as recited in claim 10 wherein the request is identifiable using a method name included in the request.

12. The method as recited in claim 1 further comprising using an optional setting of a GIOP decoder so as not to exclude an underlying interface definition of a protocol data unit so that a correctly encoded method with occasional coding errors is decodable.

13. The method as recited in claim 1 wherein the performing the decoding operation is performed by evaluating, so as to restrict the number of the possible interface definitions, a content of a method defined in a CORBA standard that supplies information on the interface definition underlying the object.

14. The method as recited in claim 1 wherein logged protocol data units of a general inter-ORB protocol are transmitted via an internet inter-ORB protocol.

15. The method as recited in claim 1 wherein the protocol is a general inter-ORB protocol and further comprising using, via an active server, information obtained by decoding the first message to establish a connection to the active server using a non-system client application and to transmit requests to the active server.

16. The method as recited in claim 15 wherein the requests are CORBA requests.

* * * * *